(12) United States Patent
Selzer

(10) Patent No.: US 9,599,157 B2
(45) Date of Patent: Mar. 21, 2017

(54) AXIAL-RADIAL SLIDE BEARING HAVING POLYMER SLIDE ELEMENTS AND CORRESPONDING SLIDE ELEMENT

(71) Applicant: igus GmbH, Cologne (DE)

(72) Inventor: Ralf Selzer, Lohmar-Heide (DE)

(73) Assignee: igus GmbH, Cologne (DE)

( * ) Notice: Subject to any disclaimer, the term of this patent is extended or adjusted under 35 U.S.C. 154(b) by 0 days.

(21) Appl. No.: 14/780,877

(22) PCT Filed: Mar. 27, 2014

(86) PCT No.: PCT/EP2014/056150
§ 371 (c)(1),
(2) Date: Sep. 28, 2015

(87) PCT Pub. No.: WO2014/154800
PCT Pub. Date: Oct. 2, 2014

(65) Prior Publication Data
US 2016/0053809 A1  Feb. 25, 2016

(30) Foreign Application Priority Data

Mar. 28, 2013  (DE) .................... 20 2013 101 374 U

(51) Int. Cl.
*F16C 33/20* (2006.01)
*F16C 17/10* (2006.01)
*F16C 33/24* (2006.01)

(52) U.S. Cl.
CPC ............. *F16C 33/20* (2013.01); *F16C 17/10* (2013.01); *F16C 17/107* (2013.01);
(Continued)

(58) Field of Classification Search
CPC ...... F16C 17/10; F16C 17/107; F16C 27/063; F16C 33/201; F16C 33/24; F16C 2208/32
(Continued)

(56) References Cited

U.S. PATENT DOCUMENTS 2,852,802 A * 9/1958 Seby .................... E05D 1/04
                                                        16/356
3,325,855 A * 6/1967 Good .................. H01H 35/2635
                                                        16/260
(Continued)

FOREIGN PATENT DOCUMENTS

DE  1425990 A1 * 10/1969 ............ F16C 27/063
DE  2159801 A1    6/1973
(Continued)

OTHER PUBLICATIONS

PCT Search Report mailed Jul. 1, 2014, received in corresponding PCT Application No. PCT/EP14/56150, 4 pgs.
(Continued)

*Primary Examiner* — Marcus Charles
(74) *Attorney, Agent, or Firm* — Grossman Tucker Perreault & Pfleger, PLLC

(57) ABSTRACT

An axial-radial sliding bearing with polymer sliding elements includes a first bearing race and a second bearing race, which are rotatable oppositely to each other about a bearing shaft, wherein the second bearing race defines a substantially U-shaped cross section for receiving the first bearing race at least in certain regions. The sliding elements are made from tribopolymer and are arranged between the first and the second bearing races. The sliding elements each have a substantially L-shaped cross section comprising an axial region having axial sliding surfaces and a radial region having radial sliding surfaces. The radial region of the sliding elements includes at least one hinge connection, which connects two segments of the radial region in a flexible manner and so as to be movable oppositely to each other. A sliding element may include at least one such hinge connection in the radial region of the sliding element.

23 Claims, 3 Drawing Sheets

Figure 1A:
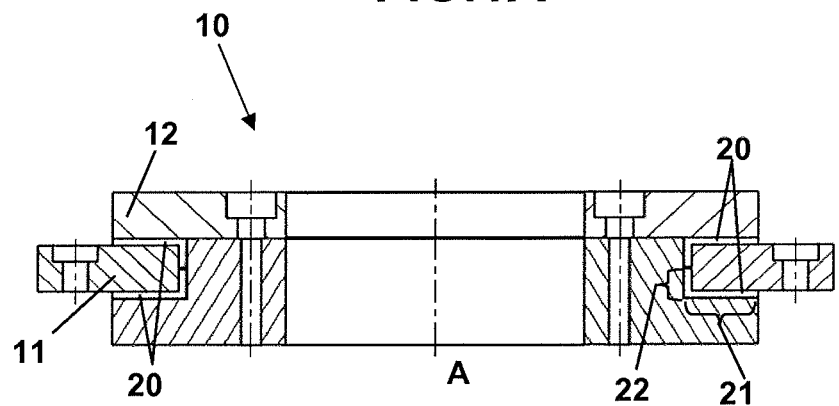

(52) U.S. Cl.
CPC ............ *F16C 33/201* (2013.01); *F16C 33/24* (2013.01); *F16C 2208/32* (2013.01)

(58) Field of Classification Search
USPC ........ 387/129, 261, 266, 276, 297; 384/129, 384/261, 266, 276, 297
See application file for complete search history.

(56) References Cited

U.S. PATENT DOCUMENTS

| | | | | |
|---|---|---|---|---|
| 4,562,668 A | * | 1/1986 | Karhu | E05C 9/08 |
| | | | | 292/216 |
| 4,942,271 A | * | 7/1990 | Corsi | H02G 3/0418 |
| | | | | 138/162 |
| 5,075,927 A | * | 12/1991 | Porta | E05D 1/04 |
| | | | | 16/273 |
| 5,147,042 A | * | 9/1992 | Levy | A61B 10/0096 |
| | | | | 206/453 |
| 5,505,545 A | | 4/1996 | Mergler | |
| 5,509,738 A | | 4/1996 | Haynes et al. | |
| 5,751,544 A | * | 5/1998 | Song | G06F 1/1616 |
| | | | | 16/261 |
| 5,765,263 A | * | 6/1998 | Bolinas | E05D 7/0423 |
| | | | | 16/250 |
| 6,113,275 A | | 9/2000 | Blase | |
| 7,490,992 B2 | | 2/2009 | Orndorff, Jr. | |
| 2010/0127136 A1 | * | 5/2010 | Markoff | F16B 45/00 |
| | | | | 248/121 |

FOREIGN PATENT DOCUMENTS

| | | | | |
|---|---|---|---|---|
| DE | 202004006697 U1 | | 3/2005 | |
| DE | 10353438 A1 | * | 6/2005 | ............... H01H 1/16 |
| DE | 202010008877 U1 | * | 2/2011 | ............... E05D 5/02 |
| DE | 102010027635 A1 | * | 1/2012 | ......... E04G 21/0445 |
| WO | 03052283 A2 | | 6/2003 | |

OTHER PUBLICATIONS

PCT International Preliminary Report on Patentability/English translation of Written Opinion mailed Oct. 8, 2015, received in corresponding PCT Application No. PCT/EP14/56150, 8 pgs.

* cited by examiner

AXIAL-RADIAL SLIDE BEARING HAVING POLYMER SLIDE ELEMENTS AND CORRESPONDING SLIDE ELEMENT

This invention generally relates to a combined axial/radial sliding bearing comprising polymer sliding elements and to a sliding element specifically developed for such sliding bearings.

A combined axial/radial sliding bearing designed as a composite structure is known from U.S. Pat. No. 5,509,738. Sliding elements made from a polymer, particularly from a polyimide, are here fixed onto metal bearing halves. For forming an axial sliding surface in the form of a circular disc, a plurality of sector-like polyimide segments is attached by bonding. For providing a cylindrical, radial sliding surface, a number of bent polyimide strips are glued in place at the inner periphery of the bearing halves. A drawback is for example that the sector segments and the bent stripes must be adapted to the dimensions of the respective bearing shells. Moreover, the expenditure in manufacturing the composite sliding bearing as disclosed in U.S. Pat. No. 5,509,738 is considerable.

The German published patent application DE 21 59 801 A relates to hinge bearing sleeves having a multilayer structure consisting of a metallic supporting layer and a self-lubricating plastic running layer arranged thereon.

From the catalog "PolymerGleitlager 06.2005" (polymer sliding bearing 06.2005) of the company of igus GmbH, an axial/radial sliding bearing of this generic kind is known (see page 50.1-50.2). This sliding bearing, which is also referred to as a polymer slewing ring bearing (PRT), comprises a first, outer bearing race and a second, inner bearing race made from metal or a suitable plastic material. Both bearing races can rotate oppositely to each other about the bearing shaft. The second, inner race is composed of two parts and has a substantially U-shaped cross section. Thus the second bearing race forms a seat by which it receives an inner peripheral part of the first bearing race.

This polymer slewing ring bearing further comprises sliding elements made from a tribologically suitable polymer ("tribopolymer"). These sliding elements are each disposed in an annular arrangement between the first and the second bearing races in order to decouple both bearing races in the axial and radial directions. To this end, the sliding elements each have a substantially L-shaped cross section in the axial plane so that axial sliding surfaces are provided on an axial region and radial sliding surfaces are provided on a radial region.

A similar axial/radial sliding bearing is also known from the German Utility Model DE 20 2004 006 697 U1, which is considered as the most relevant prior art.

Advantages of such sliding bearings are seen in particular in the low friction, in the maintenance-free operation, in the inexpensive manufacture, in the robust construction, and in the high wear resistance.

These positive characteristics of the bearing are mainly achieved by the polymer sliding elements that are employed. The sliding elements are specifically customized for every desired bearing diameter, for instance in an injection molding process. Correspondingly, the production of different bearing diameters involves corresponding costs for tools needed for the manufacture of the bearing elements, and also the warehouse management of a correspondingly high number of components is expensive.

It therefore is an object of the present invention to enable the implementation of different bearing diameters using only one geometry or component shape of the sliding element.

In accordance with the invention, this object is achieved by an axial/radial sliding bearing and, independently, also by a corresponding polymer sliding element. Here the axial/radial sliding bearing is understood to be both a sliding bearing for use under mainly an axial load and a sliding bearing for use under mainly a radial load (occasionally also referred to as a radial/axial sliding bearing).

In a generic sliding bearing or in a generic polymer sliding element, the invention provides that the radial region of the sliding elements includes at least one hinge connection, by which two segments of the radial region are connected in a flexible manner and thus movable oppositely to each other. One such hinge connection or a radial region that is subdivided into only two mutually oppositely movable segments, already afford that the sliding elements between the bearing races are capable of adapting to different diameters of the bearing races. In this connection, the hinge connection provided in the radial region allows for an adjustment of the bending of the sliding element about the bearing shaft depending on the bearing diameter and consequently the attachment of the sliding element within the radial play between the bearing races of different diameters.

Accordingly, a sliding element having a specific predetermined sliding element geometry, can be effectively used between differently sized bearing races, i.e. at least for a particular range of different bearing diameters.

Any modification of the known construction of the first and the second bearing races is not necessary at this juncture. The sliding bearings of the invention are normally suitable for use in any slewing ring bearings, particularly in those where the inner bearing race has a U-shaped cross section and supports a disc-like outer race. It goes without saying that the sliding elements are also suitable for a reversed construction with the U-shaped cross section lying outside. In both cases, the sliding element has an angled and, in the broadest sense, L-shaped cross section with two mutually transverse regions, the first one forming axial sliding surfaces and thus being referred to as the axial region and the second one forming radial sliding surfaces and thus being referred to as the radial region.

Preferably, the hinge connection in the radial region of the sliding element is manufactured similar to a living hinge, i.e. by a portion having a diminished wall thickness compared to the remaining wall thickness of the sliding element. That portion with the diminished wall thickness respectively connects two adjacent, comparatively rigid segments of at least the radial region. This enables a one-piece manufacture from only one material.

Theoretically, the hinge connection could also be implemented by an additional, flexible plastic material that is combined with a tribologically suitable plastic material in a suitable manner, e.g. by being molded to that material in an injection molding process. Alternatively or additionally, the hinge connection can be achieved also in a different way, for example by diminishing the strength of the material by means of a perforation or so between the two segments.

Thus, in the present case, the term "hinge connection" in its broadest sense is understood to be a portion that exhibits a flexibility which is higher in the radial region than in the adjacent segments. This flexibility can be obtained by additional material with a lower modulus of elasticity. Preferably, this additional flexibility is achieved by a corresponding design of the portion that functions as a hinge in a sliding element manufactured as one piece from proven and tested polymer.

In an arrangement which is ready for use, the hinge axis or the portion exhibiting increased flexibility preferably is substantially parallel to the bearing shaft and extends over the entire axial dimension of the radial sliding surfaces or the radial region. Generally, the hinge connection could be provided with a progression transversely to the bearing rotation axis, but this progression should at least include an axial component sufficiently large for allowing adjustable bending about the bearing shaft.

For permitting the use in a diameter range which is as large as possible, the invention preferably provides that the radial region of a sliding element includes several ones of the inventive hinge connections. The radial region is thus subdivided into a corresponding number of flexible, connected segments, preferably by several hinge connections. As a result, it is possible to obtain with the sliding element a bend of the radial region about the bearing rotation axis which is stronger in total, even at a stiffness of the hinge connection which is still relatively high such as in a case where the thickness of the wall or the strength of any other material is diminished as less as possible.

To make the flexibility of the radial region as high as possible in the bending or rotation directions, it is useful for the radial region of a sliding element being connected to the transverse axial region merely over the length of one single segment, such as between two hinge connections. Even this connection between two relatively rigid segments or regions is preferably accomplished in a flexible manner through an additional hinge connection. The axis of such additional hinge connections preferably runs vertically to the axis of the inventive hinge connections in the radial region.

Depending on the diameter of the axial/radial sliding bearing in which the sliding elements are used, a different clearance is naturally produced between the axial regions of adjacent sliding elements. To avoid a relative movement between the sliding elements caused by such clearances and to reduce or avoid the abrasion involved, the axial regions of the sliding elements preferably include connectors for fixing the axial regions to each other. Particularly useful are form fit connectors arranged on the outer corners. Opposing edges of adjacent sliding elements can thus be detachably connected to each other in an easy manner. Hook-and-eye snap connectors for example on the edges or corners of the axial regions can be easily produced using an injection molding process.

It is particularly advantageous to provide in the sliding elements of the invention one or more additional tapering features or cross section reductions in a transverse direction, in particular vertically to the hinge connection(s) in the radial region. As a result, the bendability of the axial region can be increased also in the case of rigid tribopolymers, thus avoiding increased wear or undesired jamming due to bulging conditional on bending.

For keeping the clearance between the axial regions of successive sliding elements, which is variable in dependence of the bearing diameter, as small as possible, it is advantageous for the layout of at least the axial regions being substantially configured as a symmetrical trapezoid with two equal sides including a relatively small angle, in particular an angle of 20°, preferably 15°.

In a practically preferred embodiment, two axially opposing sliding rings composed of a plurality of individual strung-together polymer sliding elements are arranged between the two bearing races. Two bearing races composed of individual sliding elements allow for an optimal axial and radial support of the bearing races oppositely to one another. In other cases, for instance when the radial bearing is decisive, it may be sufficient if only one single sliding ring composed of polymer sliding elements is provided where the radial regions are designed in a corresponding manner.

In both cases, polymer sliding elements of the invention are successively strung together in the circumferential direction, most expediently without considerable intermediate gaps or play, thus forming almost continuous disc-like axial bearing surfaces and almost continuous annular radial bearing surfaces.

Polymer sliding elements according to the invention allow in particular the implementation of axial/radial sliding bearings of large bearing diameters, larger than 250 mm or so, preferably larger than 500 mm. In the present description, the term "bearing diameter" is understood to mean the free inner diameter in the inside bearing race. With diameters in this range, the hinge connection of the invention can be easily produced during the manufacturing process, for instance by diminishing the strength of the material in the manner of a living hinge, even with the use of already proven and tested tribopolymers.

The construction features described above as preferable features are independently claimed as features essential for the invention also in respect of the polymer sliding element of the invention, as far as these features pertain to the sliding element per se. A polymer sliding element is particularly suitable, although not exclusively, for use in axial/radial sliding bearings, particularly slewing ring bearings, having different diameters. Due to the hinge connection, the polymer sliding element of the invention can be selectively employed also in a linear polymer sliding bearing.

In addition to the sliding element that is constructed in accordance with the invention, the invention also relates to the use of such a sliding element in an optionally designed axial/radial bearing, particularly in a sliding bearing comprising two optionally shaped bearing races that are rotatable oppositely to one another.

Figure 1B:
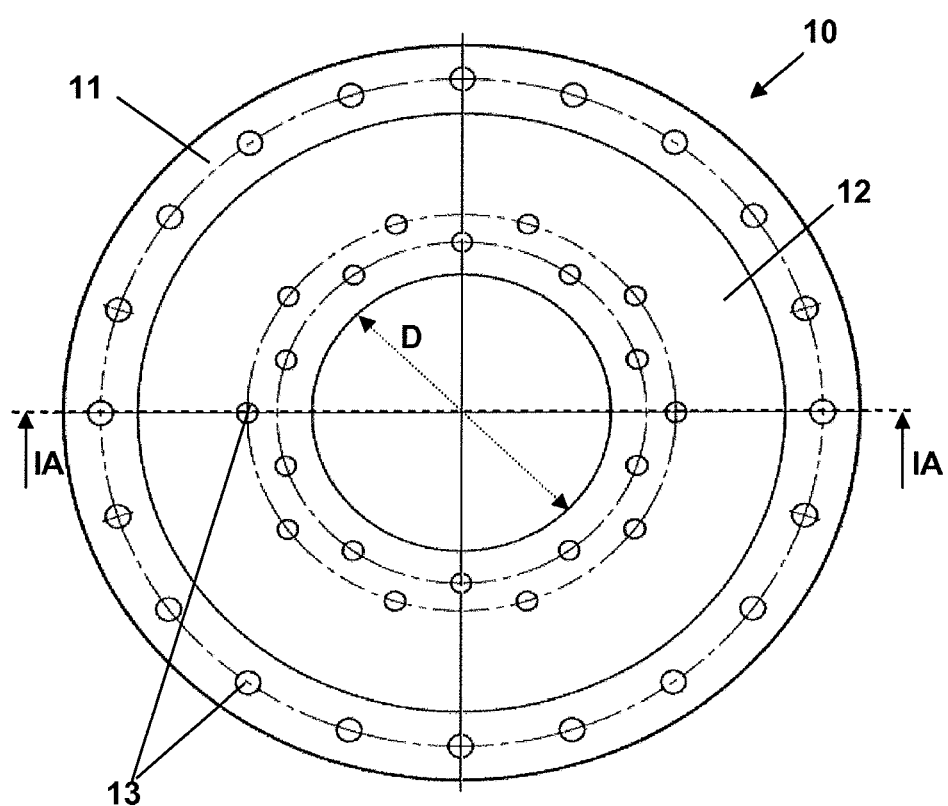
Figure 2A:
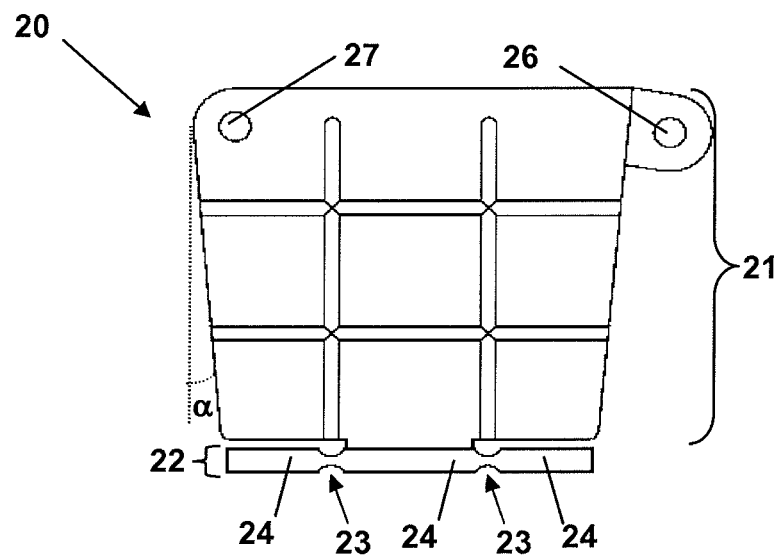
Figure 2B:
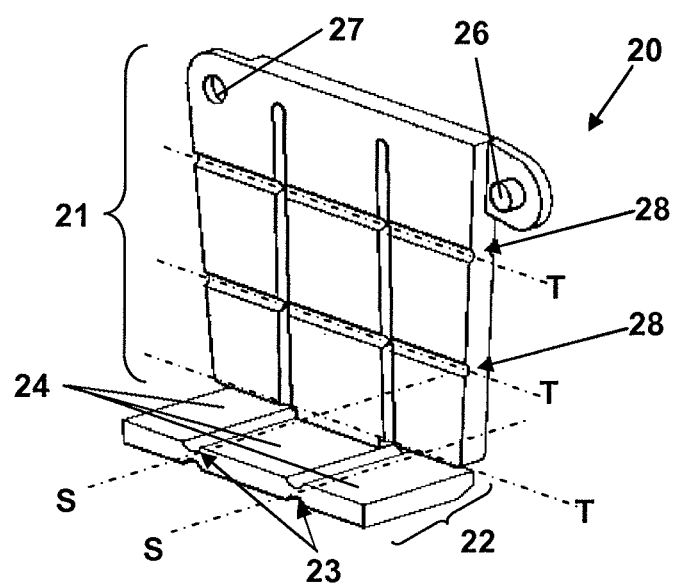
Figure 2C:
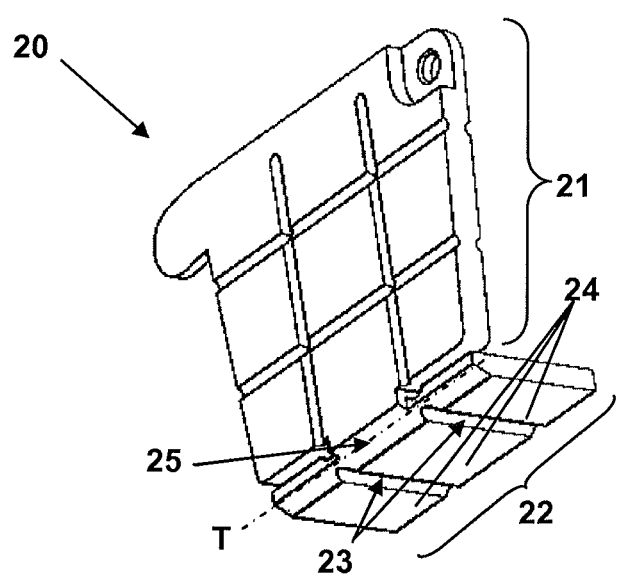

Further details, advantages and features of the invention will become apparent from the following detailed description of a preferred embodiment with reference to the attached drawings wherein it is shown by:

FIG. 1A a cross section through an axial/radial sliding bearing of the invention including polymer sliding elements, along the bearing shaft;

FIG. 1B a plan view of the axial/radial sliding bearing;

FIG. 2A a preferred embodiment of a sliding element of the invention in a plan view along the imaginary bearing shaft;

FIG. 2B a perspective view from one side of the sliding element of FIG. 2A;

FIG. 2C a perspective view from the other side of the sliding element of FIG. 2A.

In the FIGS. 1A-1B, an axial-radial sliding bearing is generally denoted by reference number 10. It comprises a first bearing race 11 and a second bearing race 12, which are manufactured in a manner known per se, typically from metal, e.g. aluminum. One of these two bearing races 11, 12 or both can also be made from a suitable plastic material. In the illustrated example, the second bearing race 12 is designed as an inner race and has a substantially U-shaped cross section. Thus the second bearing race 12 forms a seat in which the radially inner part of the first bearing race 11 is received to the full circumferential extent. As best seen in FIG. 1A, the second bearing race 12 is composed of two components flanged to each other by means of a screw connection. In the illustrated example, the first bearing race 11 is designed a one-piece outer race. By a corresponding play or clearance between the two bearing races 11, 12, the same are rotatable relative to each other about the bearing shaft A. Both bearing races 11, 12 include axial bores for the fixation of the components (not further shown) to be connected to each other in a rotatable manner. Concerning further features of suitable bearing races 11, 12 which are known per se, reference is made to prior art mentioned at the beginning.

FIG. 1A further shows sliding elements 20 made from a tribopolymer which are disposed between the first and second bearing races 11, 12, more precisely in the region of the seat in the second bearing race 12. Two opposing sliding rings uncoupling the bearing races 11, 12 axially and radially and forming sliding surfaces for the bearing races are each formed by a respective plurality of circumferentially successive sliding elements 20. To this end, the sliding elements 20 respectively have in the cross sectional plane, which includes the rotation axis A (see FIG. 1A), an approximately L-shaped cross section comprising an axial region 21 and a radial region 22 that is angled transversely, in particular substantially vertically with respect to the axial region 21.

A sliding element 20 according to the invention is shown in more detail in the FIGS. 2A-2C. The sliding element 20 is preferably manufactured as a one-piece construction in an injection molding process from a polymer that is tribologically suited for the axial and radial support of the bearing races 11, 12. In the plane of FIG. 2A, the axial region 21 with both of its major outer faces forms two opposing axial sliding surfaces for supporting the bearing races 11, 12 in the direction of the rotation axis A. Correspondingly, for the radial support or bearing, the radial region 22 on each of its major outer faces forms a radial sliding surface extending approximately vertically to the axial sliding surfaces and in a slightly curved manner in the operating position.

The radial region 22 of the sliding element 20 includes several hinge connections 23 (two hinge connections 23 in the illustrated example). The hinge connections 23 subdivide the radial region 22 into a corresponding number of segments 24 (in the present case three segments) and connect these segments 24 in flexible manner or so that the same are movable oppositely to each other. As indicated in FIG. 2B, the hinge connections 23 are configured in such a way that they allow the segments 24 being angled or bent oppositely to each other for allowing a pivot axis S to be interposed therebetween (see FIG. 2B). The hinge connections 23 are so constructed that the pivot axis S extends approximately parallel to the rotation axis A, in the operating position. As a result, the sliding element 20, particularly the radial region 22, is capable of adapting to the respective diameter D (see FIGS. 1A-1B) of the axial-radial sliding bearing 20. For this reason, a sliding element 20 having a predetermined geometry can be used in accordance with the invention for different diameters D, e.g. for bearings with a diameter D in the range of 500 mm to 600 mm or larger.

In the preferred embodiment according to FIGS. 2A-2C, the hinge connections 23 are each produced in the manner of a living hinge, i.e. by a diminished thickness of the wall of the radial region 22 in the transition between two comparatively rigid segments 24. Other implementations of hinge connections 23 are however not excluded.

For not compromising the flexibility of the segments 24 relative to each other, the radial region 22 is connected to the axial region 21 merely over the dimension of one single segment 24, in the present case the middle segment. As best seen in FIG. 2C, a further hinge connection 25 is provided for this purpose so that also the connection between the axial region 21 and the radial region 22 is constructed in a flexible manner. The further hinge connection 25 allows hinging between the axial region 21 and the radial region 22 about a transverse axis T indicated by the chain dotted line in FIG. 2C which is substantially vertical to the pivot axes S or runs tangentially to the rotational direction of the sliding bearing 10.

The FIGS. 2A-2C further show that vertically to the pivot axis S of the hinge connections 23 of the radial region 22 there are further diminishments of the cross section 28 which are each offset from and parallel to the first transverse axis T (of FIG. 2C). Further diminishments of the cross section can be provided also vertically to the first transverse axis T (of FIG. 2C) and can be particularly easily implemented by an extension at the level of the hinge connection 23. By a suitable arrangement of such diminishments of the cross section 28, the bendability of the axial region 21 can be adapted as needed irrespective of the material of the sliding bearing 20.

As shown by the FIGS. 2A-2C, it is useful if the layout of the entire sliding element 20, which is arranged flat, but at least of the largest possible axial region 21 is designed corresponding to an equal-sided trapezoid. Here, both equal sides can include an angle of less than 20°, preferably less than 15°, and can conically taper in the direction towards the imaginary rotation axis A. For the purpose of illustration, the corresponding half angle $\alpha$ is indicated by the dotted lines in FIG. 2A. Thus the gap width between adjacent axial regions 21 and between adjacent radial regions 22 is optimized in the circumferential direction.

The FIGS. 2B-2C show an engagement hook 26 on the outer corners of the sliding element 20 as well as suitable eyes 27 for receiving the engagement hook 26 of an adjacent sliding element 20. Engagement hooks 26 and eyes 27 on the sliding elements 20 allow a form fit connection of adjacent sliding elements 20 for securing in the circumferential direction or tangentially to the rotation axis A.

Finally it should be noted that in the FIGS. 2A-2C a flat, planar arrangement of the radial region 22 is shown, but the angle between the segments 24 about the pivot axis S can be freely chosen within a large range or can be adjusted according to the diameter D by the hinge connections 23. On the other hand, the suitability of the sliding elements 20 for linear sliding bearings is also the result of the planar arrangement shown in the FIGS. 2A-2C.

LIST OF REFERENCE NUMBERS

10 axial-radial sliding bearing
11 first bearing race
12 second bearing race
13 bores
20 sliding element
21 axial region
22 radial region
23 hinge connection
24 segments
25 hinge connection
26, 27 form fit connector
28 diminishment of the cross section
A rotation axis
D (inner) diameter
S pivot axis
transverse axis
$\alpha$ half angle (between sides of trapezoid)

The invention claimed is:

1. Axial-radial sliding bearing with polymer sliding elements, comprising:

a first bearing race and a second bearing race which are rotatable oppositely to each other about a bearing shaft, wherein the second bearing race defines a substantially U-shaped cross section for receiving the first bearing race;

sliding elements made from a polymer, which are arranged between the first and the second bearing races for uncoupling the bearing races axially and radially, wherein the sliding elements each have a substantially L-shaped cross section comprising an axial region having axial sliding surfaces and a radial region having radial sliding surfaces; and wherein the radial region of the sliding elements includes at least one hinge connection, which connects two segments of the radial region in a flexible manner and so as to be movable relative to each other so that the sliding elements are adapted to a diameter of the axial-radial sliding bearing.

2. Axial-radial sliding bearing according to claim 1, wherein the hinge connection is produced similar to a living hinge by a diminished wall thickness between the segments in the radial region.

3. Axial-radial sliding bearing according to claim 1, wherein the radial region of the sliding elements includes several hinge connections that subdivide the radial region into several flexibly connected segments.

4. Axial-radial sliding bearing according to claim 1, wherein only one segment of the radial region is connected to the axial region in a flexible manner via a further hinge connection.

5. Axial-radial sliding bearing according to claim 1, wherein the axial regions of the sliding elements present connectors arranged on outer corners, for fixing the axial regions to each other.

6. Axial-radial sliding bearing according to claim 1, wherein, for increasing the bendability of the axial region, one or several diminishments of the cross section proceed in the transverse direction to a pivot axis of the at least one hinge connection of the radial region.

7. Axial-radial sliding bearing according to claim 1, wherein at least the axial regions of the sliding elements have a trapezoidal layout with two equal sides that include an angle ($2\alpha$) of $\leq 20°$.

8. Axial-radial sliding bearing according to claim 1, wherein, between the bearing races, two opposing sliding rings composed of a plurality of sliding elements are arranged, and that the bearing races are axially and radially supported one against the other.

9. Axial-radial sliding bearing according to claim 1, wherein an inner diameter of the axial-radial sliding bearing amounts to 250 mm at minimum, to 500 mm at minimum.

10. A polymer sliding element for an axial-radial sliding bearing, the polymer sliding element comprising: a substantially L-shaped cross section comprising an axial region having axial sliding surfaces and a radial region having radial sliding surfaces; and wherein the radial region includes at least one hinge connection, which connects two segments of the radial region in a flexible manner and so as to be movable relative to each other so that the sliding element can be adapted to a diameter of the axial-radial sliding bearing.

11. Polymer sliding element according to claim 10, wherein the hinge connection is produced in the manner of a living hinge by a diminished wall thickness between the segments in the radial region.

12. Polymer sliding element according to claim 10, wherein the radial region of the sliding elements includes several hinge connections that subdivide the radial region into several flexibly connected segments.

13. Polymer sliding element according to claim 10, wherein one segment of the radial region is flexibly connected to the axial region via a further hinge connection.

14. Polymer sliding element according to claim 10, wherein the axial regions of the sliding elements present connectors, arranged on outer corners, for fixing the axial regions to each other.

15. Polymer sliding element according to claim 10, wherein, for increasing the bendability of the axial region, one or several diminishments of the cross section proceed in the transverse direction to a pivot axis of the at least one hinge connection of the radial region.

16. Polymer sliding element according to claim 10, wherein at least the axial regions of the sliding elements have a trapezoidal layout with two equal sides that include an angle ($2\alpha$) of $\leq 20°$.

17. Polymer sliding element for a sliding bearing, wherein the sliding element has a substantially L-shaped cross section comprising an axial region having axial sliding surfaces and a radial region having radial sliding surfaces; and wherein the radial region exhibits a flexibility which is higher than in the axial region and has segments that are movable relative to each other so that the sliding element can be adapted to a diameter of an axial-radial sliding bearing.

18. Polymer sliding element according to claim 17, wherein the radial region is integrally made of a tribopolymer and has a diminished strength of material compared to the axial region.

19. Polymer sliding element according to claim 17, wherein the radial region of the sliding elements includes several hinge connections that subdivide the radial region into several flexibly connected segments.

20. Polymer sliding element according to claim 19, wherein one segment of the radial region is flexibly connected to the axial region via a further hinge connection.

21. Polymer sliding element according to claim 17, wherein only one segment of the radial region is connected to the axial region.

22. Polymer sliding element according to claim 10, wherein the polymer sliding element is made from a tribopolymer.

23. Polymer sliding element according to claim 17, wherein the polymer sliding element is made from a tribopolymer.

* * * * *